(No Model.) 2 Sheets—Sheet 2.

J. CONMEE.
AUTOMATIC WEIGHING SCALES.

No. 407,170. Patented July 16, 1889.

Witnesses.
F. B. Featherstonhaugh.
W. G. McMillan

Inventor.
James Conmee
G. Donald C. Ridout & Co
Attys

UNITED STATES PATENT OFFICE.

JAMES CONMEE, OF PORT ARTHUR, ONTARIO, CANADA.

AUTOMATIC WEIGHING-SCALES.

SPECIFICATION forming part of Letters Patent No. 407,170, dated July 16, 1889.

Application filed November 1, 1888. Serial No. 289,730. (No model.)

*To all whom it may concern:*

Be it known that I, JAMES CONMEE, esquire, of the town of Port Arthur, in the District of Algoma, in the Province of Ontario, Canada, have invented a certain new and Improved Automatic Weighing-Scale, of which the following is a specification.

The object of the invention is to design a simply-constructed and accurate weighing-scale whereby the weight of an article may be ascertained and automatically registered by simply placing it on the table or platform of the scale; and it consists, essentially, of a series of levers arranged in connection with an adjustable weight calculated when at zero to balance the weighing table or platform and mechanism connected therewith, a pivoted pointer being connected to the levers and to the adjustable weight, whereby the movement of the levers shall operate the pointer so as to adjust the said weight to a point on the weigh-beam which will produce an equilibrium between the article being weighed and the adjustable balance-weight, the whole being constructed substantially as hereinafter more particularly explained.

Figure 1:
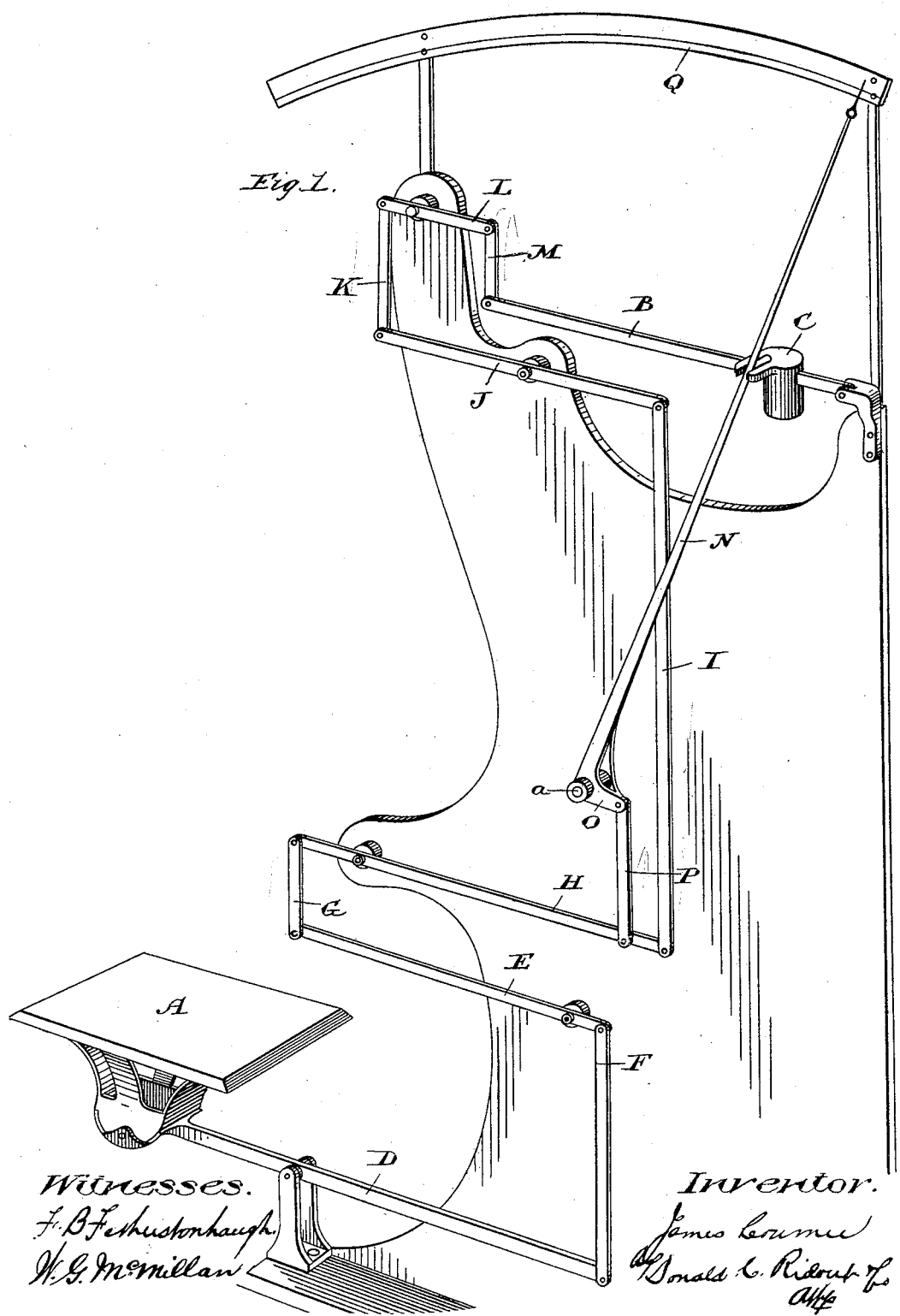
Figure 2:
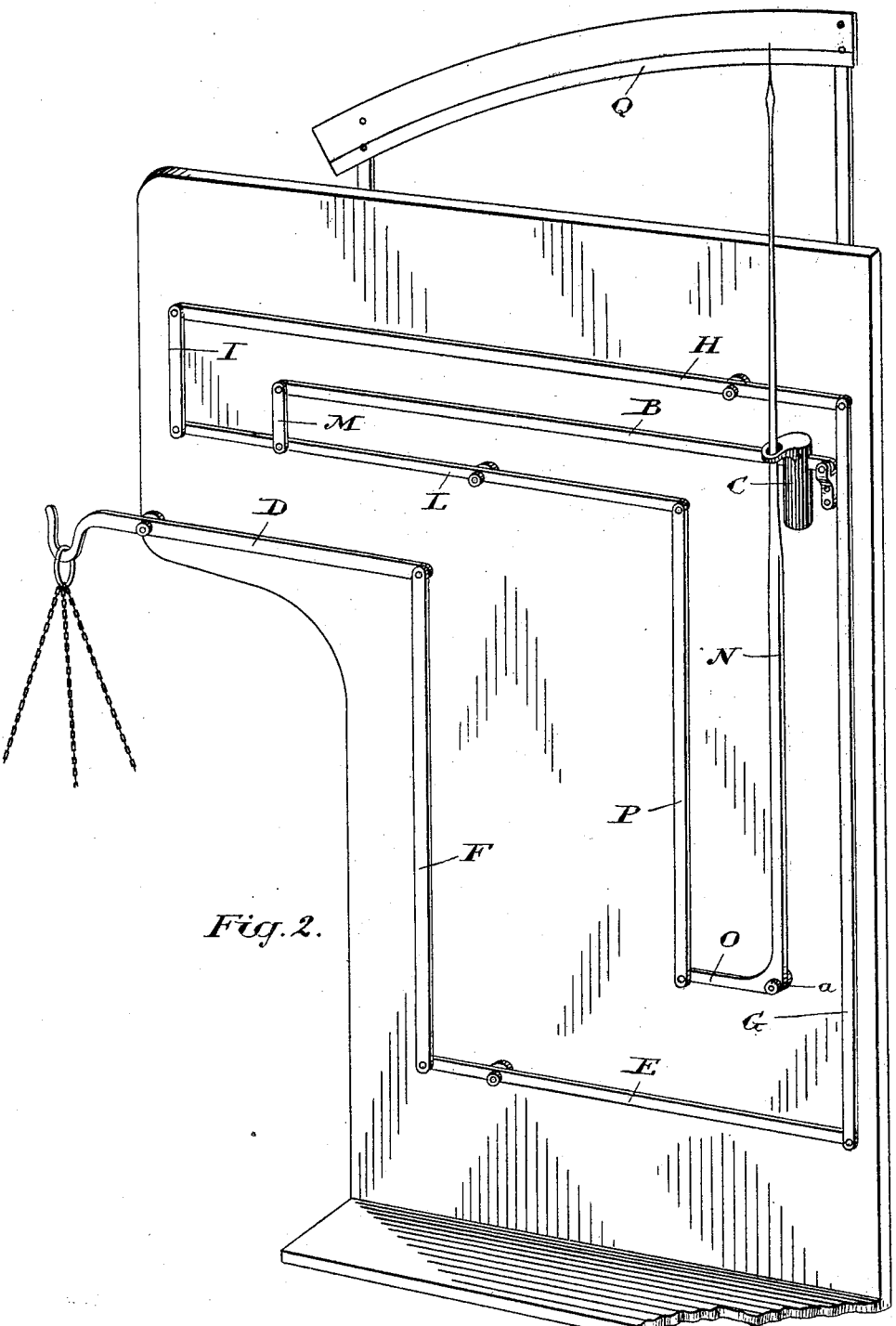

Figure 1 is a perspective view of a table or platform weighing-scale constructed in accordance with my invention. Fig. 2 is a perspective view of a steelyard-scale constructed in accordance with my invention.

In the drawings, like letters of reference indicate corresponding parts in each figure; but for the purpose of this specification I shall describe each figure by itself.

In Fig. 1, A is the table or platform on which the article to be weighed is placed, and B is the weigh-beam on which the adjustable balance-weight C is placed.

The object of my invention is to arrange a system of levers by which the balance-weight C will be accurately adjusted on the weigh-beam B to counterbalance any weight placed on the table A.

For the purpose of this description I will assume that the table A weighs fifty pounds and that the balance-weight C, weighing a pound and seven-eighths, when placed one foot from the fulcrum of the weigh-beam B will exactly balance the table A and the levers connected therewith. In order to accomplish this it will be necessary to make the short arm of the lever D two feet and its long arm four feet, and the short arm of the lever E one foot from its fulcrum to the point of its connection with the link F and four feet from its fulcrum to the point where it connects with the link G, which connects the long arm of the lever E with the short arm of the lever H, and this short arm measures one foot to its fulcrum, while the long arm of the lever H measures four feet to the point where it connects with the link I. This latter link connects the lever H with one end of the balanced lever J. The other end of this balanced lever is connected by the link K to the short arm of the lever L, measuring one-third of a foot. The long arm of the said lever, measuring one foot, is connected to the end of the weigh-beam B by the link M. This measurement will be found approximately correct without considering the element of friction.

N is a pointer pivoted at *a* and having a crank-arm O formed on it, which crank-arm is connected by the link P to the lever H. As a consequence of this connection the upward movement of the long arm of the lever H must cause the pointer N to rock on its pivot, and as the said pointer is held in contact with the weight C the movement of the said pointer adjusts the weight C to such point on the weigh-beam B as will cause the said weight C to counterbalance the weight placed upon the table A. It will be noticed that the pointer N extends to a marked scale Q, graded to indicate the weight on the table A, represented by the adjustment of the balance-weight C.

In the arrangement shown in Fig. 2 the balanced lever J is dispensed with and the weigh-beam B is connected to the lever L two feet from the pivot of the said lever L, and one foot from the outside of this connection the lever L is connected directly to the lever H and the pointer N is connected to the lever L instead of to the lever H, as shown in Fig. 1. The other parts are practically the same, except that the balance-weight C would have to weigh about 2.30 pounds.

What I claim as my invention is—

An automatic weighing-scale consisting of a series of levers arranged in connection with an adjustable weight calculated when at zero to balance the weighing table or platform and mechanism connected therewith, a pivoted pointer being connected to the levers and to the adjustable weight, whereby the movement of the levers shall operate the pointer so as to adjust the said weight to a point on the weigh-beam which will produce an equilibrium between the article being weighed and the adjustable balance-weight, substantially as and for the purpose specified.

Toronto, October 16, 1888.

JAMES CONMEE.

In presence of—
    CHARLES C. BALDWIN,
    CHARLES H. RICHES.